United States Patent
Berke et al.

(10) Patent No.: US 9,921,629 B2
(45) Date of Patent: Mar. 20, 2018

(54) SYSTEMS AND METHODS FOR A MULTI-RAIL VOLTAGE REGULATOR WITH CONFIGURABLE PHASE ALLOCATION

(71) Applicant: Dell Products L.P., Round Rock, TX (US)

(72) Inventors: Stuart Allen Berke, Austin, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/952,250

(22) Filed: Nov. 25, 2015

(65) Prior Publication Data
US 2017/0147050 A1    May 25, 2017

(51) Int. Cl.
| G06F 1/00 | (2006.01) |
| G06F 13/00 | (2006.01) |
| G05F 1/577 | (2006.01) |
| G06F 1/26 | (2006.01) |
| G06F 1/32 | (2006.01) |

(52) U.S. Cl.
CPC ............. G06F 1/26 (2013.01); G06F 1/3234 (2013.01)

(58) Field of Classification Search
CPC .................................................. G06F 1/3203
USPC ....................................................... 713/300
See application file for complete search history.

(56) References Cited

U.S. PATENT DOCUMENTS

| 6,449,676 | B1* | 9/2002 | Johari | G06F 1/26 361/18 |
| 7,999,520 | B2* | 8/2011 | Luo | H02J 1/102 323/267 |
| 8,219,832 | B2* | 7/2012 | Breen, III | H02M 1/38 323/234 |
| 8,566,599 | B2* | 10/2013 | Bhangi | G06F 21/34 713/182 |
| 8,892,911 | B2* | 11/2014 | Makley | G06F 1/26 713/300 |
| 8,923,081 | B2* | 12/2014 | Jeong | G11C 7/00 365/191 |
| 9,304,561 | B2* | 4/2016 | Cueva Gonzalez | G06F 1/26 |
| 9,306,456 | B2* | 4/2016 | Zhang | H02M 3/158 |
| 9,401,641 | B2* | 7/2016 | Mathew | H02M 3/1584 |
| 9,459,689 | B2* | 10/2016 | Ganpule | G06F 1/3296 |
| 9,476,921 | B2* | 10/2016 | Luo | G06F 1/26 |
| 9,634,486 | B2* | 4/2017 | Park | H02J 3/00 |
| 2015/0355698 | A1* | 12/2015 | Luo | G06F 1/28 702/62 |
| 2016/0013654 | A1* | 1/2016 | Saha | H02J 1/14 307/29 |

* cited by examiner

Primary Examiner — Suresh Suryawanshi
(74) Attorney, Agent, or Firm — Jackson Walker L.L.P.

(57) ABSTRACT

In accordance with embodiments of the present disclosure, an information handling system may include a processor and a power system comprising a plurality of voltage regulator phases, wherein at least one of the plurality of voltage regulator phases comprises an allocable voltage regulator phase that is configured to be selectively allocated to one of at least a first voltage rail and a second voltage rail of the information handling system based on a hardware configuration of the information handling system.

15 Claims, 2 Drawing Sheets

SYSTEMS AND METHODS FOR A MULTI-RAIL VOLTAGE REGULATOR WITH CONFIGURABLE PHASE ALLOCATION

TECHNICAL FIELD

The present disclosure relates in general to information handling systems, and more particularly to systems and methods for providing a multi-rail voltage regulator with a configurable phase allocation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Many voltage regulators may be capable of operating in multiple phases, wherein a phase for a voltage regulator may typically refer to combining a driver and a power stage to form one phase. Thus, a multi-phase voltage regulator may include multiple instances of such combinations.

Oftentimes, an information handling system may require multiple voltage rails to power components requiring different power supply voltages. Traditionally, such requirements have been satisfied by providing a stand-alone voltage regulator for each such rail. To enable many configurations of components within an information handling system, each voltage regulator would typically include a number of phases to ensure it can meet power requirements of the components to which power is supplied on each rail. Accordingly, in a configuration of components in which some do not require all of the phases of the voltage regulator providing power to such components, such phases may in a sense be "wasted," adding cost to and taking space up in an information handling system.

SUMMARY

In accordance with the teachings of the present disclosure, the disadvantages and problems associated with existing approaches to providing multiple power rails in an information handling system may be reduced or eliminated.

In accordance with embodiments of the present disclosure, an information handling system may include a processor and a power system comprising a plurality of voltage regulator phases, wherein at least one of the plurality of voltage regulator phases comprises an allocable voltage regulator phase that is configured to be selectively allocated to one of at least a first voltage rail and a second voltage rail of the information handling system based on a hardware configuration of the information handling system.

In accordance with these and other embodiments of the present disclosure, a method may include, in an information handling system comprising a plurality of voltage regulator phases, selectively allocating at least one allocable voltage regulator phase of voltage regulator phases to one of at least a first voltage rail and a second voltage rail of the information handling system based on a hardware configuration of the information handling system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a plurality of voltage regulator phases, selectively allocate at least one allocable voltage regulator phase of voltage regulator phases to one of at least a first voltage rail and a second voltage rail of the information handling system based on a hardware configuration of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
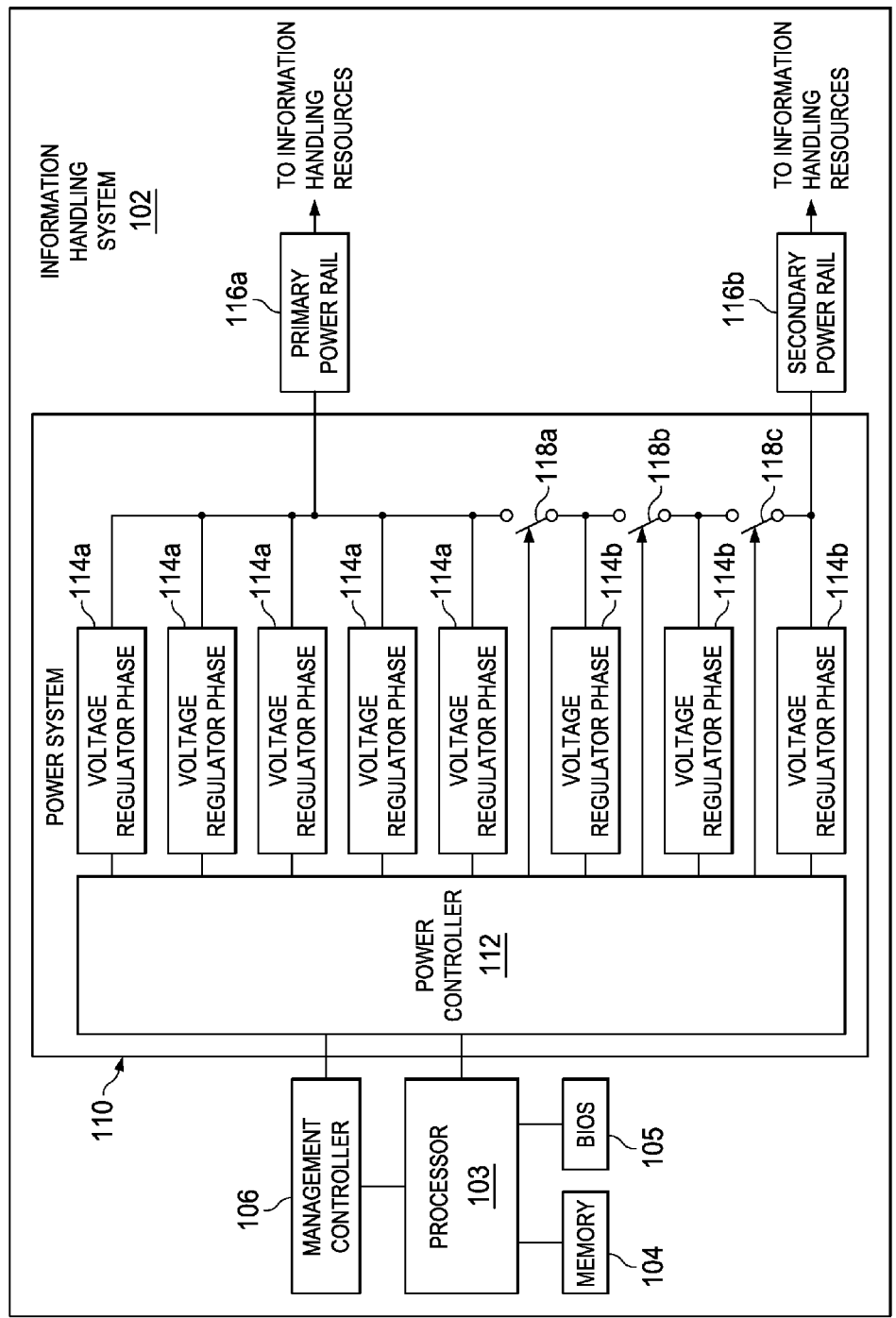
FIG. 1 illustrates a block diagram of an example information handling system, in accordance with embodiments of the present disclosure.
Figure 2:
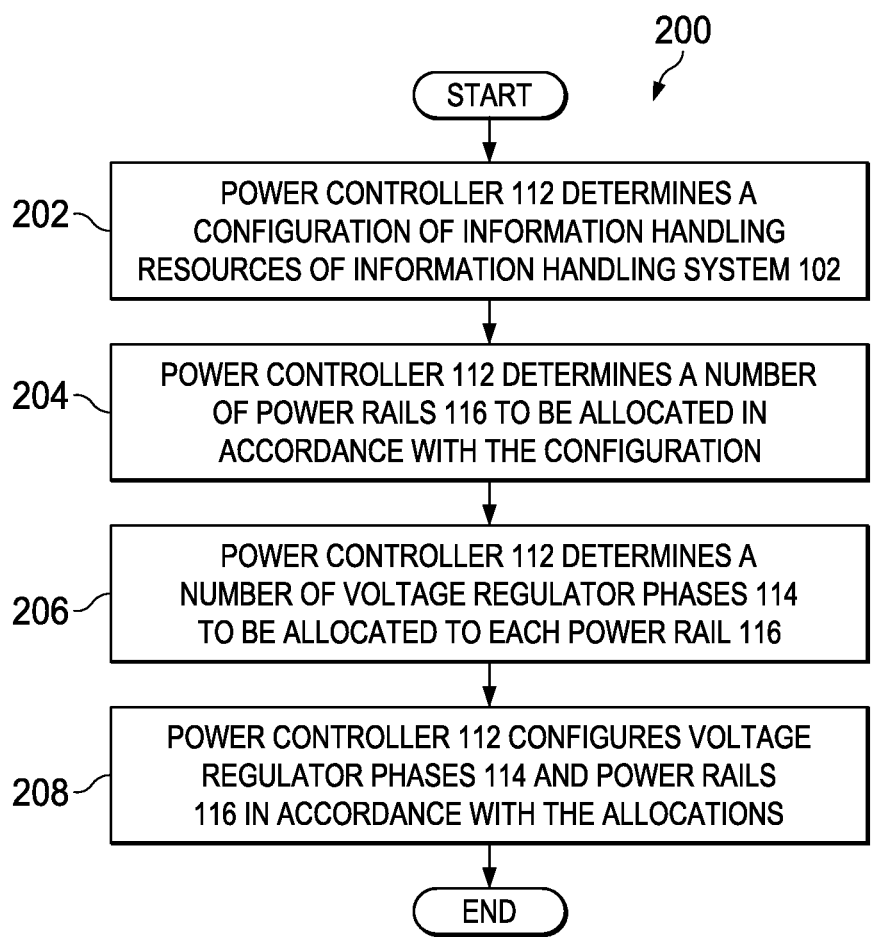
FIG. 2 illustrates a flow chart of an example method for configuring a voltage phase regulator allocation, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 106 communicatively coupled to processor 103, a power system 110, a primary power rail 116a for supplying power to one or more information handling resources of information handling system 102, and a secondary power rail 116b for supplying power to one or more information handling resources of information handling system 102. Primary power rail 116a and secondary power rail 116b may be referred to individually as a power rail 116 or collectively as power rails 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to facilitate configuration of allocation of voltage regulator phases of power system 110 between power rails 116, as described in greater detail below.

Management controller 106 may be configured to provide out-of-band management facilities for management of information handling system 102. Such management may be made by management controller 106 even if a host system of information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with power system 110 in order to facilitate configuration of allocation of voltage regulator phases of power system 110 between power rails 116, as described in greater detail below.

Power system 110 may include a power controller 112, a plurality of voltage regulator phases 114, and one or more control switches 118 (e.g., control switches 118a, 118b, 118c) which may include one or more statically-allocated voltage regulator phases 114a and one or more dynamically-allocable voltage regulator phases 114b. Power controller 112 may include any system, device, or apparatus configured to control the output of power system 110, selectively enable and disable voltage regulator phases 114, and/or allocate phases 114 between power rails 116.

Each voltage regulator phase 114 may include any system, device, or apparatus configured to supply a portion of the total current output of power system 110. In embodiments in which power system 110 is a multi-phase voltage regulator, a voltage regulator phase 114 may comprise a phase of the voltage regulator. As shown in FIG. 1 and discussed briefly above, a voltage regulator phase 114 may include either a statically-allocated voltage regulator phase 114a or a dynamically-allocable voltage regulator phase 114b. A statically-allocated voltage regulator phase 114a may be one which, regardless of a hardware configuration of information handling resources of information handling system 102, is allocated to provide current to primary power rail 116a. On the other hand, a dynamically-allocable voltage regulator phase 114b may be one which may be selectively allocated (e.g., by power controller 112 manipulated by control switches 118) between primary power rail 116a and secondary power rail 116b based on a hardware configuration of information handling resources of information handling system 102.

In operation, power controller 112 may selectively enable and disable one or more voltage regulator phases 114 in response to an electrical current requirement of information handling resources, such that one or more phases may be shed to reduce power consumption of power system 110 in response to the reduced current requirement, and thus increase power efficiency of information handling system 102.

A control switch 118 may comprise any electrical component that may complete or break an electrical circuit based on a control signal (e.g., a control signal communicated from power controller 112) provided to such control switch 118. For example, each control of switches 118a, 118b, and 118c may be activated (e.g., enabled, closed, turned on) in which case all voltage regulator phases 114 depicted in FIG. 1 may be allocated to primary power rail 116a (such allocation may be made, for example, when a secondary power rail 116b is not present or needed). As another example, each of control switches 118a and 118b may be activated and control switch 118c may be deactivated (e.g., disabled, open, turned off) in which case seven voltage regulator phases 114 may be allocated to primary power rail 116a and one regulator phase may be allocated to secondary power rail 116b. As a further example, each of control switches 118a and 118c may be activated and control switch 118b may be deactivated in which case six voltage regulator phases 114 may be allocated to primary power rail 116a and two regulator phases may be allocated to secondary power rail 116b. As an additional example, each of control switches 118b and 118c may be activated and control switch 118a may be deactivated in which case five voltage regulator phases 114 may be allocated to primary power rail 116a and three regulator phases may be allocated to secondary power rail 116b.

Each of primary power rail 116a and secondary power rail 116b may be capable of supplying power to information handling resources of information handling system 102. For example, in some embodiments, processor 103 may comprise or be part of a multichip package that combines a processing core requiring one regulated voltage supply with an integrated non-core package (e.g., a field programmable gate array or "FPGA," integrated graphics chip, or other integrated package) requiring another regulated voltage supply. In such embodiments, the processing core may be powered from primary power rail 116a while the non-core chip may be powered from secondary power rail 116b. As another example, memory 104 may be implemented using different types of memory modules wherein each type requires a different regulated voltage, with primary power rail 116a providing one of such regulated supply voltages and secondary power rail 116b providing another regulated supply voltage.

In some embodiments, power controller 112 may also be capable of determining a hardware configuration of information handling resources of information handling system 102 and allocate voltage regulator phases 114 to each of primary power rail 116a and secondary power rail 116b based on such hardware configuration. For example, in embodiments in which power rails 116 may be used to support two or more output rails for a multi-chip package comprising a processing core and a non-core package, power controller 112 may determine whether processor 103 comprises a processing core only or whether it comprises a multi-chip package, and when it comprises a multi-chip package, the type of multi-chip package. Based on such determination, power controller 112 may allocate a number of output rails 116 and a number of voltage regulator phases 114 per rail in accordance with a predetermined allocation (e.g., as set forth in a configuration file stored in a computer-readable medium of power controller 112). In some embodiments, detection of the type of processor 103 may occur before main system rail power-on by management processor 106 powered by an auxiliary power domain which may read information from processor 103 (e.g., a read-only memory including information regarding the type of processor), and management controller 106 may communicate such information to power controller 112 (e.g., via Inter-Integrated Circuit (I2C), System Management Bus (SMBus) or Power Management Bus (PMBus)). In other embodiments, detection of the type of processor 103 may occur by management controller 106 or by BIOS 105 executing on processor 103 reading control status register fields associated with processor 103. In these and other embodiments in which the type of processor 103 may not be detected before main power rails (e.g., power rails 116) are enabled, information handling system 102 may startup with a minimum number of rails and phases per rail to allow for reading of the processor type in a manner that would adhere to safe power sequencing requirements of processor 103 (including any non-core package integrated within processor 103). In such cases, it may be necessary to perform an abbreviated or "stubbed" power-on to safely read the processor type, then perform a power-off and full power sequence with the determined voltage regulator allocation requirements. In other embodiments, management controller 106 or another component of information handling system 102 may store the processor-type hardware configuration in a non-volatile memory device such that subsequent power-ons may bypass processor detection steps, provided it can be determined that processor 103 has not been removed or replaced.

In addition to processor 103, memory 104, BIOS 105, management controller 106, power system 110, and power rails 116, information handling system 102 may include one or more other information handling resources. For example, in some embodiments, information handling system 102 may include more than two power rails 116. In these and other embodiments, power system 110 may include greater or fewer voltage regulator phases 114 than that depicted in FIG. 1.

In addition, although the allocation of voltage regulator phases 114 in FIG. 1 is depicted as being controlled by power controller 112 and control switches 118, other mechanisms may be used to connect voltage regulator phases 114 in accordance with the hardware configuration of information handling system 102. For example, in some embodiments power system 110 may include customer and/or factory installed jumpers with power system 110 for coupling together voltage regulator phases 114 in order to provide a desired allocation. In other embodiments, such coupling may occur within a device package itself, wherein power system 110 may provide an allocation of voltage regulator phases 114 between two power planes, and such power planes may be segregated or coupled together within a device package itself based on the type of device package.

In some embodiments, per-voltage regulator phase 114 optimizations may be performed to eliminate or mitigate the effects (e.g., impedances, voltage drops) of control switches 118 depending on the specific switch implementation method. For instance, if metal-oxide-semiconductor field-effect transistors (MOSFETs) or other field-effect transistors (FETs) are used to implement control switches 118, compensation may take place to account for FET characteristics to ensure power rails 116 stay within their required voltage ranges and that dynamically-allocable voltage regulator phases 114 provide balanced current to their load. As a particular example, when FETs are used to dynamically select/isolate phases, calibration or compensation of individual phases may be needed to account for added phase impedance. Such calibration/compensation may be accomplished through utilization of phase current offsets that will may be stored in a non-volatile memory of power controller 112 and selected at startup. Such calibration/compensation may in essence drive a higher duty cycle to overcome impedance added to select phases. An alternative method would to match impedance across all phases. While this approach would not require individual phase current adjustments, thus reducing code complexity, it may come with the penalty of added power loss across phases.

In some alternate embodiments, where separate motherboard assemblies for each hardware configuration (e.g., for each processor 103 multi-chip package variant) may be used, zero-ohm resistors may be used in lieu of control switches 118 to allocate and isolate voltage regulator phases 114. Such implementations may still require determinations of information handling resource configurations (e.g., multi-chip processor type) to ensure such hardware configuration is compatible with the rail and phase allocation made by the motherboard.

FIG. 2 illustrates a flow chart of an example method 200 for configuring a voltage phase regulator allocation, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, power controller 112 may determine a hardware configuration of information handling resources of information handling system 102. Examples of approaches for determining such hardware configuration are described in greater detail above. At step 204, power controller 112 may, based on such hardware configuration, determine a number of power rails 116 to be allocated in accordance with the configuration. At step 206, power controller 112 may, based on such hardware configuration, determine a number of voltage regulator phases 114 to be allocated to each power rail 116. At step 208, power controller 112 may then configure voltage regulator phases 114 and power rails 116 in accordance with the allocations. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
at least first and second voltage rails;
a power system comprising a plurality of voltage regulator phases, the plurality of voltage regulator phases including at least one allocable voltage regulator phase and at least one statically allocated voltage regulator phase;
a first switch coupled between the first voltage rail and the allocable voltage regulator phase; and
a second switch coupled between the second voltage rail and the allocable voltage regulator phase;
wherein the allocable voltage regulator phase is configured to be selectively allocated to the first voltage rail by the first switch being closed and the second switch being open, or to the second voltage rail by the first switch being open and the second switch being closed, the selective allocation being based on a hardware configuration of the information handling system; and wherein the statically allocated voltage regulator phase is allocated to the first voltage rail by being coupled directly to the first voltage rail without an intervening switch.

2. The information handling system of claim 1, further comprising a power controller configured to, based on the hardware configuration:

determine a number of voltage rails to be allocated to information handling resources of the information handling system;

determine a number of voltage regulator phases to be allocated for each of the voltage rails to be allocated; and selectively allocate the allocable voltage regulator phase to one of at least the first voltage rail and the second voltage rail based on the number of voltage rails to be allocated and the number of voltage regulator phases to be allocated to each of the voltage rails to be allocated.

3. The information handling system of claim 1, wherein the hardware configuration comprises an indication of whether the processor comprises a multi-chip package.

4. The information handling system of claim 3, wherein the hardware configuration comprises an indication of a type of the multi-chip package.

5. The information handling system of claim 1, wherein the hardware configuration comprises an indication of memory modules implementing a memory of the information handling system.

6. A method comprising:

in an information handling system that includes at least first and second voltage rails and a plurality of voltage regulator phases, the plurality of voltage regulator phases including at least one allocable voltage regulator phase and at least one statically allocated voltage regulator phase, the information handling system further including a first switch coupled between the first voltage rail and the allocable voltage regulator phase and a second switch coupled between the second voltage rail and the allocable voltage regulator phase:

selectively allocating the at least one allocable voltage regulator phase to the first voltage rail by closing the first switch and opening the second switch, or to the second voltage rail by opening the first switch and closing the second switch, wherein the selectively allocating is based on a hardware configuration of the information handling systems;

wherein the statically allocated voltage regulator phase is allocated to the first voltage rail by being coupled directly to the first voltage rail without an intervening switch.

7. The method of claim 6, further comprising, based on the hardware configuration:

determining a number of voltage rails to be allocated to information handling resources of the information handling system;

determining a number of voltage regulator phases to be allocated for each of the voltage rails to be allocated; and selectively allocating the allocable voltage regulator phase to one of at least the first voltage rail and the second voltage rail based on the number of voltage rails to be allocated and the number of voltage regulator phases to be allocated to each of the voltage rails to be allocated.

8. The method of claim 6, wherein the hardware configuration comprises an indication of whether a processor of the information handling system comprises a multi-chip package.

9. The method of claim 8, wherein the hardware configuration comprises an indication of a type of the multi-chip package.

10. The method of claim 6, wherein the hardware configuration comprises an indication of memory modules implementing a memory of the information handling system.

11. An article of manufacture comprising:

a non-transitory computer-readable medium; and computer-executable instructions carried on the non-transitory computer-readable medium, the instructions readable by a processor of an information handling system that includes at least first and second voltage rails, a plurality of voltage regulator phases including at least one allocable voltage regulator phase and at least one statically allocated voltage regulator phase, a first switch coupled between the first voltage rail and the allocable voltage regulator phase, and a second switch coupled between the second voltage rail and the allocable voltage regulator phase, the instructions, when read and executed, for causing the processor to selectively allocate the allocable voltage regulator phase to the first voltage rail by closing the first switch and opening the second switch, or to the second voltage rail by opening the first switch and closing the second switch, the selective allocation being based on a hardware configuration of the information handling systems;

wherein the statically allocated voltage regulator phase is allocated to the first voltage rail by being coupled directly to the first voltage rail without an intervening switch.

12. The article of claim 11, the instructions for further causing the processor to, based on the hardware configuration:

determine a number of voltage rails to be allocated to information handling resources of the information handling system;

determine a number of voltage regulator phases to be allocated for each of the voltage rails to be allocated; and selectively allocate the allocable voltage regulator phase to one of at least the first voltage rail and the second voltage rail based on the number of voltage rails to be allocated and the number of voltage regulator phases to be allocated to each of the voltage rails to be allocated.

13. The article of claim 11, wherein the hardware configuration comprises an indication of whether the processor comprises a multi-chip package.

14. The article of claim 13, wherein the hardware configuration comprises an indication of a type of the multi-chip package.

15. The article of claim 11, wherein the hardware configuration comprises an indication of memory modules implementing a memory of the information handling system.

* * * * *